United States Patent
Wessling

(10) Patent No.: US 6,832,738 B2
(45) Date of Patent: Dec. 21, 2004

(54) SEPARATION DEVICE FOR UNDERWATER PELLETIZER

(75) Inventor: Christopher Wessling, Munster (DE)

(73) Assignee: BKG Bruckmann & Kreyenborg Granuliertechnik GmbH, Munster (DE)

(*) Notice: Subject to any disclaimer, the term of this patent is extended or adjusted under 35 U.S.C. 154(b) by 153 days.

(21) Appl. No.: 10/148,803

(22) PCT Filed: Oct. 24, 2001

(86) PCT No.: PCT/DE01/04059
§ 371 (c)(1),
(2), (4) Date: Aug. 27, 2002

(87) PCT Pub. No.: WO02/47879
PCT Pub. Date: Jun. 20, 2002

(65) Prior Publication Data
US 2003/0102395 A1 Jun. 5, 2003

(30) Foreign Application Priority Data
Dec. 13, 2000 (DE) .......................... 100 62 113

(51) Int. Cl.$^7$ .............................................. B02C 18/18
(52) U.S. Cl. ........................................................ 241/294
(58) Field of Search ................................. 425/311, 313; 241/294

(56) References Cited

U.S. PATENT DOCUMENTS

| 4,874,307 A | 10/1989 | Comper et al. |
| 5,009,586 A | 4/1991 | Pallmann |
| 6,386,469 B1 | 5/2002 | Meister et al. |

FOREIGN PATENT DOCUMENTS

| DE | 2 215 841 | 10/1972 |
| DE | 196 42 389 | 4/1997 |
| DE | 198 55 617 | 6/2000 |
| GB | 1 382 701 | 2/1975 |

Primary Examiner—Mark Rosenbaum
(74) Attorney, Agent, or Firm—Merchant & Gould P.C.

(57) ABSTRACT

The invention relates to a separation body holder (1) for submerged granulators, with a multiplicity of radially extending arms (2), which in each case display an indentation for receiving and holding a separation body (4). The separation body is exchangeably fastened in the indentation by means of screws or the like, and the separation body holding is arranged on a drive shaft (7). The separation body holding, with its separation bodies, works together with a cut-off head, and the separation bodies are formed as rectangular impact slats. The bottom surface of each indentation runs substantially parallel to the axis of the drive shaft (7).

4 Claims, 2 Drawing Sheets

Figure 1:
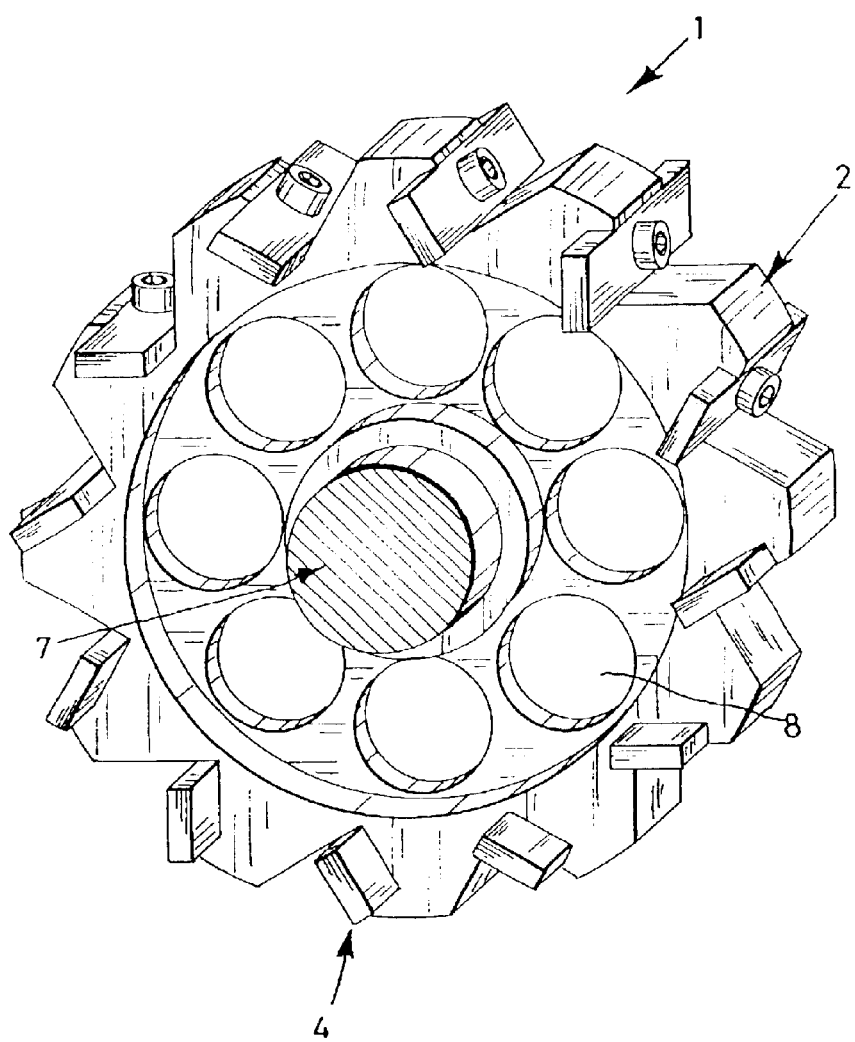

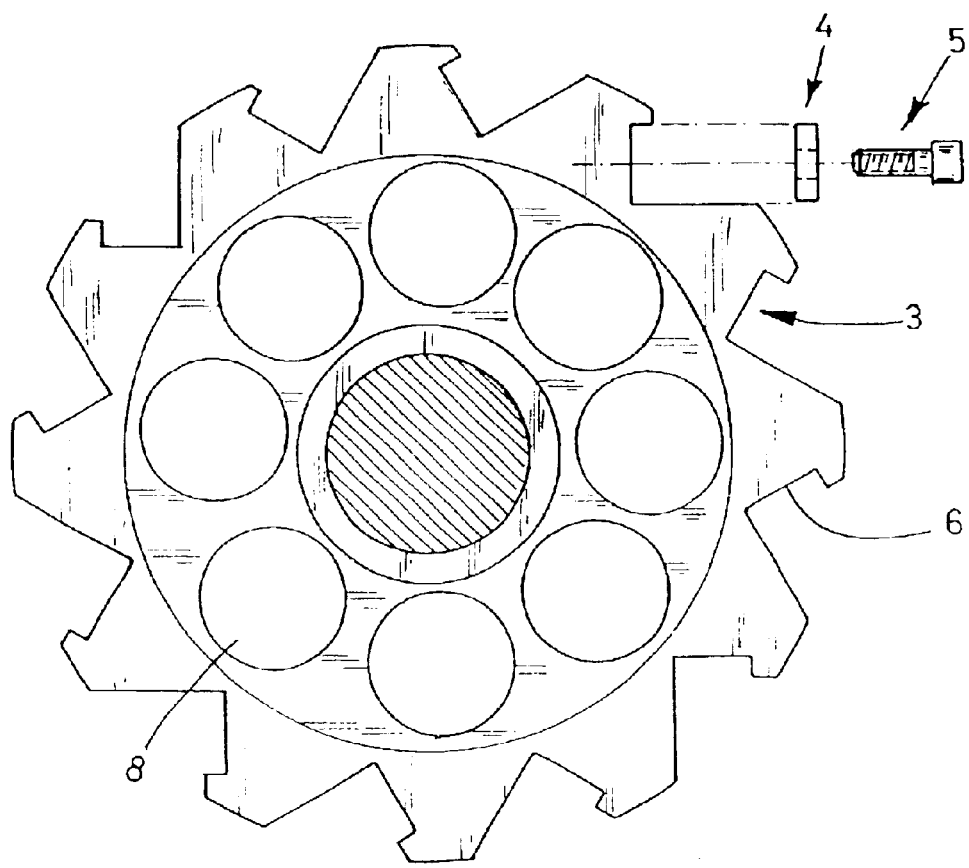
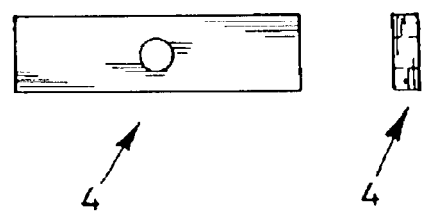

SEPARATION DEVICE FOR UNDERWATER PELLETIZER

The invention relates to a separation device for submerged granulators according to the precharacterizing clause of the main claim.

Submerged granulators display an inlet housing with an inlet channel for receiving a polymer melt, the polymer melt flowing through a conical projection and deflected outwardly into a multiplicity of extrusion openings in a nozzle plate, which displays an cut-off head that consists of wear-resistant material. Provision is made on the nozzle plate for a cutting chamber, which displays an inlet channel for the circulation water and an outlet channel for the water and the produced pellets. A drive shaft runs through the cutting chamber and holds and drives a separation body holder. In the prior art, for example according to DE 196 42 389 A1, the separation body holder carries a multiplicity of cutting knives, the blades of which work together with the cut-off head and the exit locations of the nozzles. The cutting knives are here formed as sharp knives at their front edges, as viewed in the direction of rotation, and stand at an angle of approximately 45° to the cut-off head, provision being made in the arms of the separation body holder carrying the cutting knives for correspondingly oblique receiving indentations. The fixing of the cutting knives in the arms of the separation body holder takes place, in the prior art, through screws or the like.

Through the oblique, i.e. strongly inclined, arrangement of the cutting knives, the number of the knives is limited. Through the oblique orientation of the knives in the prior art, on the basis of the rotation in the water there occurs again and again a self-pressing of the knives, by virtue of the suction action of the knife head. The expenditure for sharpening the knives is high, and the sharp knife edges present, during each repair, the risk of serious cutting injuries.

The invention is based on the object of improving the generic device such that the expenditure for the production of the separation body is avoided, the injury danger is reduced, and an accurately-tracking guidance of the separation body is achievable.

This objective, forming the basis of the invention, is achieved through the teaching of the main claim.

Advantageous configurations of the invention are explained in the dependent claims.

Expressed in other words, instead of the sharpened knives used in the prior art, provision is made for simple separation bodies that are designed as rectangular impact slats, these rectangular separation bodies being arranged in the indentations of the separation body holder such that the bottom surface of each indentation runs approximately parallel to the axis of the drive shaft.

Thus, the separation bodies no longer consist of knives and, viewed in the direction of rotation, are no longer arranged obliquely with respect to the cut-off head, but rather they stand approximately perpendicular to the plane of the cut-off head, and therefore do not form knives, but rather paddles or impact slats. From this alone it is evident that the expense for production of these separation bodies is substantially lower than the expense for production of the knives used in the prior art, and that, due to the orientation of the separation bodies, more separation bodies can be placed onto one separation body holder than was hitherto possible in the prior art. The surface of the separation body bearing surface is smaller, while having the same stability, and the separation bodies always run in an accurately-tracking manner.

A self-pressing of the knives, due to the suction effect of the knife head in the prior art, as happens again and again by virtue of the rotation of the oblique knives in the water, is no longer possible in the case of the impact slats designed according to the invention, i.e. a more reliable guiding of the separation body holder is achieved.

The separation bodies cannot bend and flex in the axial direction.

In contrast with the prior art, provision is further made for providing the actual separation body holder with perforations, which make possible an effortless removal of the pellets detached by the impact slats.

According to a further feature of the invention, the impact slats or separation bodies can be lightly chamferred on their side pointing towards the cut-off head, in order thereby to achieve, during the first rotation of the impact slats and their contact with the impact head, a precise, equal resting of the impact slats against the cut-off head. Since the impact slats are fixed in the indentations of the arms of the separation body holder by means of screws, slight differences in the projection of the impact slats with respect to the plane of the separation body holder are possible, which differences are equalized through the first rotational movements of the separation body holder, upon contact of the impact slats with the cut-off head.

An embodiment example of the invention is explained in the following, with reference to the drawings. The latter show:

FIG. 1: diagrammatically, a separation body holder with inserted separation bodies;

FIG. 2: in a graphical view, the separation body holder;

FIG. 3: a detail view of a separation body.

Represented in FIG. 1 is a separation body holder 1, which is carried and driven by a drive shaft 7. The separation body holder 1 displays radially-directed arms 2, in which are designed indentations 3, into which the separation bodies 4 are placed, which separation bodies are fixed inside the indentations 3 by means of screws 5 or the like.

Represented in FIG. 3, in frontal and side views, is a separation body 4, and it is evident that it is a matter here of a simple impact slat, thus not a sharpened or pointed knife.

The bottom surface 6 (FIG. 2) of each indentation 3 is preferably directed parallel to the axis of the drive shaft 7, so that any substantial inclination of the separation body 4 relative to this drive shaft 7 is avoided. As a maximum inclination of the separation body 4 relative to the drive shaft 7, an angle of up to 10° should not be exceeded.

In order to achieve a good carrying away of the produced pellets, the separation body holder 1 is provided with perforations 8.

What is claimed is:

1. Separation device for submerged granulators comprising a separation body holder with a multiplicity of radially extending arms, which display in each case an indentation for receiving and holding a separation body, the separation body being exchangeably fastened into the indentation by a fastening arrangement, and the separation body holder being arranged on a drive shaft and working together with a cut-off head, wherein:

a) the separation bodies are formed as rectangular impact slats, and b) a bottom surface of each indentation runs substantially parallel to the axis of the drive shaft.

2. Separation device according to claim 1, wherein the separation body holder is provided with perforations.

3. Separation device according to claim 1, wherein the impact slats are chamferred on one edge directed towards the cut-off head.

4. Separation device for submerged granulators comprising a separation body holder with a multiplicity of radially extending arms, which display in each case an indentation for receiving and holding a separation body, the separation body being exchangeably fastened into the indentation by a fastening means, and the separation body holder being arranged on a drive shaft and working together with a cut-off head, wherein:

a) the separation bodies are formed as rectangular impact slats, and b) a bottom surface of each indentation runs substantially parallel to the axis of the drive shaft.

* * * * *